United States Patent

Körner et al.

[11] Patent Number: 5,083,987
[45] Date of Patent: Jan. 28, 1992

[54] SELF-LOCKING HYDROSTATIC DIFFERENTIAL GEARING

[75] Inventors: Tillmann Körner, Königsbronn/Zang; Klaus Brosius, Heidenheim; Konrad Langenbeck, Gerlingen, all of Fed. Rep. of Germany

[73] Assignee: J. M. Voith GmbH, Heidenheim, Fed. Rep. of Germany

[21] Appl. No.: 583,520

[22] Filed: Sep. 17, 1990

[30] Foreign Application Priority Data

Sep. 22, 1989 [DE] Fed. Rep. of Germany ....... 3931745

[51] Int. Cl.[5] .................. F16H 1/455; F16H 1/42
[52] U.S. Cl. .......................... 475/90; 475/88; 475/252
[58] Field of Search ............ 475/88, 90, 248, 249, 475/252

[56] References Cited

U.S. PATENT DOCUMENTS

| | | | |
|---|---|---|---|
| 1,229,548 | 9/1916 | Vansant et al. | 475/90 |
| 2,693,720 | 7/1951 | Wildhaber | 475/90 |
| 2,949,792 | 8/1960 | Smith | 475/88 |
| 3,251,244 | 5/1966 | Nilkell | 475/252 X |
| 3,350,961 | 8/1965 | Dodge | 475/88 |
| 3,437,186 | 4/1969 | Roper | 475/88 X |

FOREIGN PATENT DOCUMENTS

| | | |
|---|---|---|
| 3542184 | 6/1987 | Fed. Rep. of Germany. |
| 3810169 | 10/1989 | Fed. Rep. of Germany. |
| WO86/02420 | 4/1986 | PCT Int'l Appl. .......... 475/90 |

Primary Examiner—Leslie A. Braun
Assistant Examiner—Daniel Wittels
Attorney, Agent, or Firm—Baker & Daniels

[57] ABSTRACT

With a differential gearing having a spur gear construction, the compensating gears (31a, 31b) are installed in meshing pairs and are tightly enclosed by a housing (14) so that with meshing spur gears (22, 23) they can act as toothed pumps with pressure zones, with a locking moment being produced between the two driven shafts (2,3). A substantial increase in the locking moment is achieved in that the compensating gears constructed as pinions are disposed in a determined sequence on the circumference of the spur gears and also comprise along their face width partitions (32) which prevent a reduction in pressure along the toothing. As a result with an equal number of pinion pairs there is produced a number of pressure zones which is more than double and consequently there is an increase in the locking moment developed.

7 Claims, 2 Drawing Sheets

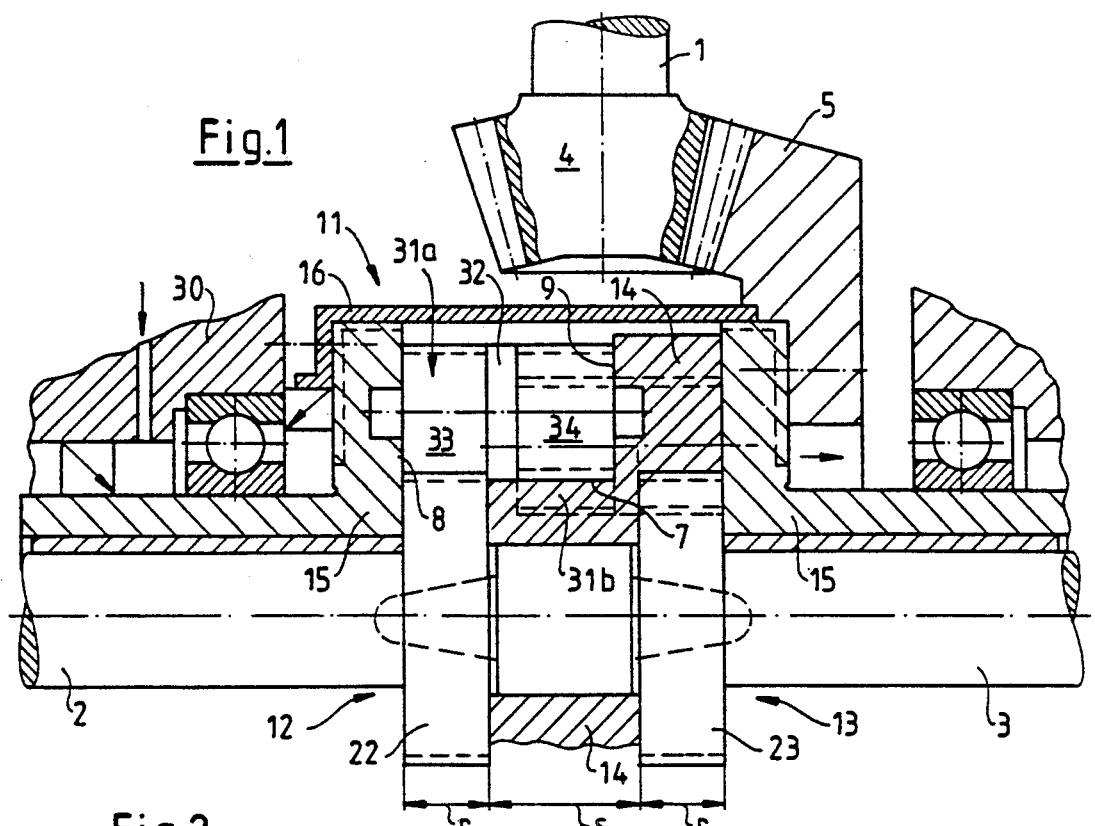
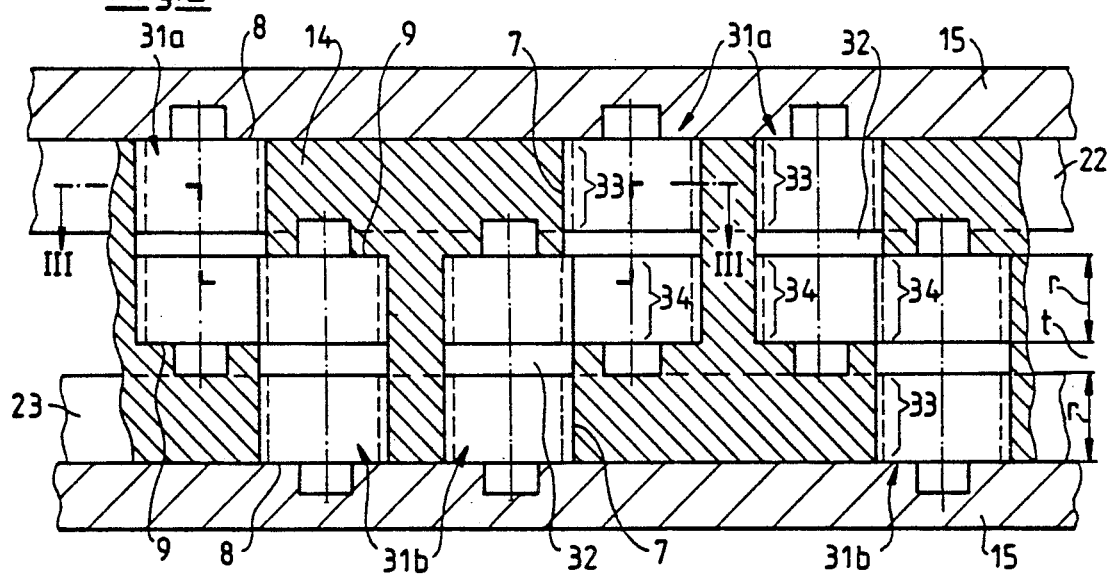
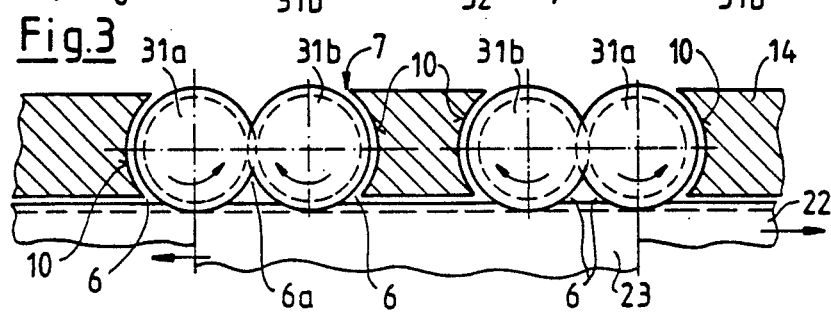

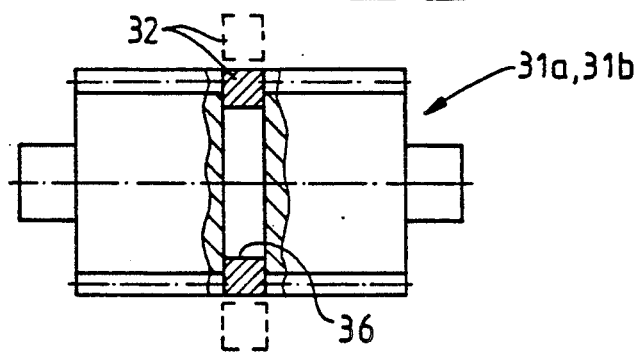
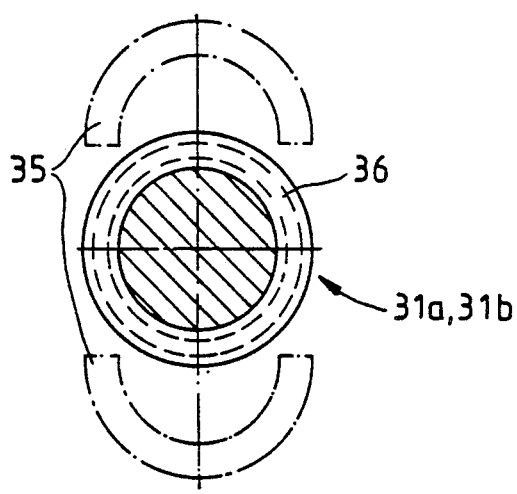
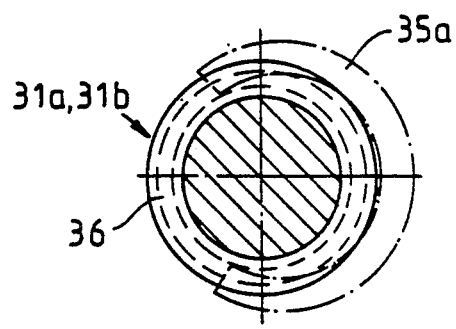
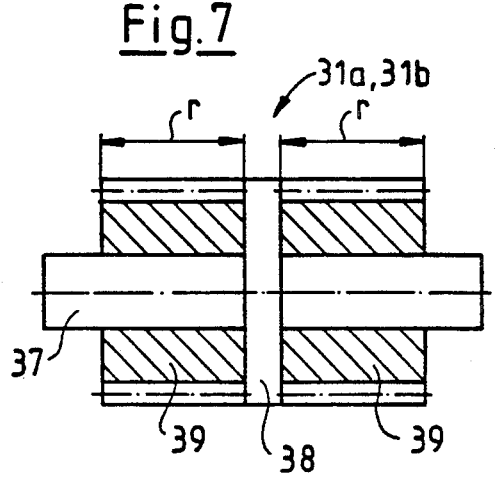
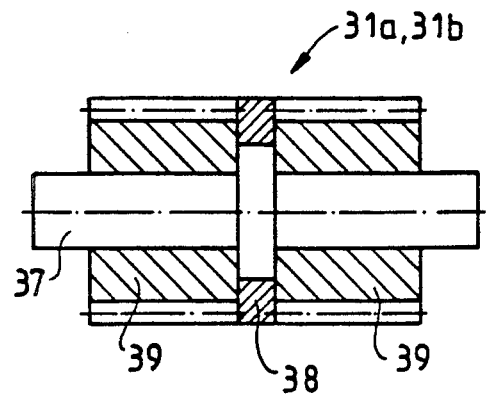

SELF-LOCKING HYDROSTATIC DIFFERENTIAL GEARING

BACKGROUND OF THE INVENTION

The invention relates to self-locking hydrostatic differential gearing for the distribution of an input torque to two driven shafts with an incorporated locking mechanism of the type having an input shaft which drives a first gear component in which spur-toothed compensating gears having parallel axes of rotation are rotatably housed, of which at least two respectively mesh with one another, and operate as geared pumps with enclosed operating medium, with one pinion being in engagement with a second gearing component and the other pinion being in engagement with a third gearing component, the axis of rotation of which and also the axis of rotation of the second gearing component extending parallel to the axis of rotation of the compensating gears which are enclosed as far as possible by the first gearing component and between this have sealing clearances to achieve the throttling effect, with, when viewed in circumferential direction, respectively two adjacent pinions which do not mesh with one another, being in engagement with the same gearing component and having the following further features:

a) in the region of the toothing the circumference of the pinions is as wide as possible and the front sides of the second and third gearing components are tightly enclosed for formation tip clearance conduits and lateral clearance conduits;

b) each pinion comprises just a single toothing geometry with additional pressure zones being formed in the common region of engagement of two meshing pinions of a pinion pair;

c) with the assistance of a casing the first gearing component is fluid-tight with respect to the interior of the differential gear housing in which a drive gear attached to the first gearing component rotates.

Differential gearings of this type are used in particular in vehicle drives to distribute the drive torque to the wheels on each side or to several axes of the vehicle.

As known, the purpose of locking mechanisms on differentials is to ensure that, at least on one driven side of the differential, i.e. the wheel on one side of the vehicle retains a large part of its torque if, on the other side of the differential, i.e. the wheel on the other side of the vehicle does not transmit a torque. For this purpose from German Patent Specification 35 42 184 apparatus is known with which in an epicyclic differential gearing the epicyclic gears form geared pumps with the sun wheel and the annular gear wheel. For this purpose all clearances on the front sides and on the tip surfaces are constructed as parallel sealing clearances and are dimensioned in such a way that a build-up of pressure is produced by throttling the leakage return flow. This build-up of pressure is a standard for the locking moment between the two driven sides of the differential gearing. However in the disclosed development the known differential gearing can not develop any drive or locking moment of the same level on the two driven sides. Moreover, the maximum locking moment developed is relatively small, in particular for applications where no transmission stage increasing the drive or locking moment is provided behind the two driven shafts.

To increase and simultaneously to divide the locking and output torque uniformly over the two driven sides of the differential gearing, it has been proposed in Applicants earlier German Patent Application P 38 10 169.6-12 to construct the differential gearing just as a spur gear differential. The two driven shafts support spur gears of equal size, which are mutually connected by means of pinions disposed in pairs in such a way that the effect of geared pumps is again produced. Each pinion of a pinion pair meshes both with one of the two spur gears and also with the other adjacent pinion. To obtain a number of pressure zones which is as large as possible and consequently the largest possible locking moment, an equal number of pinion pairs is provided. The arrangement in the circumferential direction is selected so that two adjacent and not mutually meshing pinions are in engagement with the same driven spur gear. This alternating arrangement of the pinion pairs over the circumference of the spur gears achieves a significant increase in the locking moment, but this is still not adequate for many applications.

SUMMARY OF THE INVENTION

The object of the invention is to refine the Applicants earlier proposal in such a way that between the driven shafts an even greater locking moment is developed by simple means, in particular with a very slight difference in the rotational speed between the driven shafts. This object is achieved by the features of the present invention.

It has been shown that effective pressure zones are formed between the rotating pinions or spur gears on the one hand the housing surrounding the pinions, but that there is a reduction in pressure along the face width in the central region of the differential between the two spur gears. In accordance with the invention it is ensured that each pinion in the central region of the face width is provided with a partition, as as result of which two engagement regions for meshing are formed on each pinion. With one region of engagement each pinion is in engagement with the appropriate spur gear, and with the other region with the adjacent pinion. The partition in the central region of each pinion has round external contours corresponding to the addendum diameter. The spur gears, which are in engagement with one pinion from each pinion pair, are disposed with mutual axial spacing on the front side, which corresponds to the thickness of two partitions plus the width of the region of engagement between two adjacent pinions. Consequently it is guaranteed that both the regions of engagement of the two pinions of a pinion pair with respect to one another and also the engagement of each pinion with the appropriate spur gear are sealed on both sides. As a result it is no longer possible for pressure medium to escape laterally to the extent known, as soon as this medium is pressurised in the corresponding rotational direction to form a pressure zone opposite the housing. Instead with the invention the number of pressure zones active with a relative rotation of the two driven shafts could clearly be increased. If, with the arrangement described in Applicants earlier application, four pinion pairs, for example, are distributed over the circumference of the two spur gears, four pressure zones which develop a locking moment are produced in each rotational direction. With the arrangement specified by the invention when $n=4$ pinion pairs the number of pressure zones $=(2 \times n) + n/2 = 10$ pressure zones symetrically in each rotational direction. This clear increase in the number of pressure zones can be used to increase the locking moment depending on the application. It is also possible to reduce the manufacturing expenditure for the differential by larger manufacturing tolerances being permitted for the clearances opposite the gears of the pinions.

From U.S. Pat. No. 3,251,244 there is already known a spur gear differential in which the spur gears are also connected via pinions disposed in pairs in such a way that they can operate as geared pumps. In this case the pinions are constructed from several parts and are individually attached to a shaft. Each individual pinion part is bordered on both sides by parts of the housing wall. Only the pinions which mesh with the spur gears are in a position to develop a locking moment by the build-up of hydrostatic pressure, but the pinion parts meshing with one another in the central region of the differential are not able to do this. The known differential also has a symmetrical arrangement of the pinion pairs in such a way that with the construction shown having three pinion pairs the plurality of pressure zones disclosed in the main application by the alternating arrangement of the pinion pairs has not yet been achieved. With the known differential gearing the hydrostatically developed locking moment is only meant to be effective on one of the two driven sides, i.e. on the side which can not transmit a torque and therefore assumes a high rotational speed. The level of the locking moment is determined by incorporated valve arrangements, the function of which is also influenced by the action of centrifugal force.

Advantageous refinements of the invention are given in the embodiments of the present invention. According to one embodiment, the two regions of engagement on both sides of the partition may have the same width. This simplifies the manufacture of the pinions. According to another embodiment it is specified that the region of engagement of the pinions is constructed to be the same width as the face width of the two driven spur gears. Further embodiments, describe possible structural designs for the partition on each pinion. The partition can be constructed as a component having two parts or a plurality of parts and can be placed on the pinion from the radially outward direction. The partition can also be inserted in the form of a snap ring in a deeply cut groove in the pinion. It is also possible to construct the pinion from several parts, i.e. as a shaft with a solid or separately positioned central flange, on which parts having teeth on both sides are disposed adjacent to the flange in a rotationally secure manner.

BRIEF DESCRIPTION OF THE DRAWINGS

The invention is explained in more detail below by means of the drawings, which show an exemplified embodiment.

FIG. 1 shows a diagrammatic longitudinal section through the differential according to the invention, FIG. 2 shows a diagrammatic representation of the pinions in the circumferential direction, FIG. 3 shows a section through the pinion region along line III—III of FIG. 2, FIG. 4 shows a section through a pinion, FIG. 5 shows a structural detail of a pinion with a two-part partition, FIG. 6 shows a constructive detail of a pinion with a partition snapped into place, FIG. 7 shows pinions with a massive central flange, and FIG. 8 shows pinions with a separately positioned flange.

DESCRIPTION OF THE PREFERRED EMBODIMENTS

The differential gearing shown in FIG. 1 essentially corresponds to that shown in FIG. 1 of Applicants earlier application with the same components being given the same reference numbers. A drive shaft 1, which is connected to a driving engine (not shown), and supports a bevel pinion 4 which meshes with a bevel gear 5, provides the drive. Output is provided by two driven shafts 2 and 3. The differential gearing also comprises a first gearing element 11, which is connected to the bevel gear 5, and a second and third gearing component 12, 13, which are assigned to the driven shafts 2, 3. To the first gearing component 11 there belongs a housing 14, in which pinions 31a, 31b are lodged paraxially to the driven shafts and engage with the spur gears 22, 23. The spur gears 22, 23 are assigned to the second and third gearing component 12, 13, with the arrangement, as known in principle, being such that the pinion 31a engages with spur gear 22, and pinion 31b engages with spur gear 23, and such that the pinions 31a, 31b are designed with such a width and are lodged at such a proximity in the housing 14 that they mesh with one another.

The spur gears 22, 23 are disposed coaxially and consequently they are only connected to each other via the pinions 31a, 31b. If the rotational speed of the driven shafts 2, 3 is equal, there is no relative rotation of the pinions around their own axis. However if the rotational speeds differ, the pinions 31a, 31b rotate in different directions of rotation, depending on which driven shaft, 2 or 3, rotates more quickly or more slowly with respect to the other one.

The locking effect of the differential is achieved by the fact that, as per se known, the spur gears 22, 23 and the pinions 31a, 31b operate as geared pumps, with the pump moment developed directly representing the locking moment between the two driven shafts 2, 3. For this purpose the housing 14 is constructed so that it encloses the pinions 31a, 31b and the spur gears 22, 23 so tightly that there are narrow tip clearances 7 between the gear tips and the housing. The housing 14 is surrounded by lateral members 15, which contain the bearing of the pinions. Between the pinions 31a, 31b and spur gears 22, 23 respectively and the lateral members 15 there are narrow transverse clearances 8, 9. In the region of engagement between the pinions and the spur gears there are pressure zones 6, which are connected by pressure with the tip clearances 7 and the transverse clearances 8, 9.

FIG. 2 shows a plan view of the pinions in a representation projected in the circumferential direction. In both figures partitions 32 can be seen on the pinions 31a and 31b, which divide the face width of the pinions into two regions of engagement 33 and 34. The regions of engagement 33 and 34 have an identical width of dimension r, and the width of the toothing of the spur gears 22, 23 is also r. In this way there are independent zones of engagement on each pinion. The axial spacing dimension s between the front sides of the spur gears 22, 23 is formed from the dimension r for the region of engagement 34 of the two pinions with respect to one another and twice the thickness t of the two partitions in the pinions 31a, 31b. From FIG. 2 the alternating arrangement of the pinions 31a and 31b can also be seen, with a pinion following a pinion 31a and meshing with the spur gear 22. The same arrangement is found on the circumference of the spur gear 23 with the pinions 31b.

FIG. 3 shows a sectional representation along the line of intersection III—III in FIG. 2. The rotational position of each pinion 31a, 31b is shown with the rotation of the spur gear 22 in the direction of the arrow. It can be seen that a pressure zone 6 is produced by the arrangement of partitions as specified by the invention inside the pinions with each engagement of a pinion 31a (or 31b) on the appropriate spur gear 22 (or spur gear 23). Furthermore pressure zones 6a are also formed on each second pair of pinions, i.e. on those which rotate in the direction of the arrow with the instantaneous relative rotation in such a way that pressure medium is conveyed from the radially outward direction along the wall 10 in the radially inward direction to the meshing pinion. The total number of the pressure zones forming a locking moment consequently corresponds to double the number of pinion pairs plus half the number of pinion pairs. With four pinion pairs this corresponds to a number of $(2\times 4)+2=10$ pressure zones 6 or 6a respectively. This considerable increase in the possible locking moment of a self-locking differential makes this particularly suitable for installation between the two wheels of a tracked vehicle wheel set, which requires a particularly torsionally rigid coupling.

FIG. 4 shows one of the pinions 31a or 31b in section. The partition 32 is inserted as a disc into the groove 36, which extends deeper than the tooth base. According to FIG. 5 the partition 32 can either be constructed as a two-part ring 35 and can be inserted from the radially outer direction. The design according to FIG. 6 is also possible as a one-part ring 35a cut open at one point, especially if a plastic is used as the material for the partition 32, i.e. the ring 35a. This ring 35a is mounted in the form of a snap ring and can also be constructed as a radial sealing ring in the form of a piston ring if required.

FIG. 7 shows a pinion construction comprising several parts. A shaft 37, which simultaneously represents the position of the pinion in the housing 14, is provided with a partition 32 constructed as a flange 38 in the central region. On both sides of the flange 38 the pinion parts 39 are attached as separate components either in a force-locking manner by shrinkage or by adhesive or in a positive manner by gearing or a mortise and tenon joint. In this case it is important that the toothing of the two pinion parts 39 is in exact alignment, so that there are no pitch errors in the differential gearing, which would cause uneven running, wear and mechanical stoppage. The design of a pinion according to FIG. 8 only differs from that according to FIG. 7 in that the partition 32 is not constructed as a solid flange 38, but is inserted as a separate component between the two pinion parts 39. This permits in particular the choice of a special material if required to compensate for thermal expansion inside the differential gearing or to adapt clearance widths to temperature conditions.

We claim:

1. A self-locking hydrostatic differential gearing having an input shaft which drives a first gearing component, said first gearing component including a housing wherein spur-toothed compensating gears having parallel axes of rotation are rotatably housed, said spur-toothed compensating gears comprising a plurality of pinions wherein at least two pinions respectively mesh with one another comprising geared pumps with enclosed operating medium, one of said pinions being in engagement with a second gearing component and another pinion being in engagement with a third gearing component, wherein the axis of rotation of said second gearing component and the axis of rotation of said third gearing component each extend parallel to the axes of rotation of said compensating gears, said compensating gears being substantially enclosed by the first gearing component and including sealing clearances for achieving a throttling effect with, when viewed in the circumferential direction, respectively two adjacent pinions which are in engagement with a common gearing component and which do not mesh with one another, said respective pinions having a region of toothing along the circumference thereof, said region of toothing being constructed as wide as possible within said structure, said second and third gearing components having front sides wherein said front sides are generally tightly enclosed for forming tip clearance conduits and lateral clearance conduits; each of said pinions further comprising a single toothing geometry, with additional pressure zones are formed in the common region of engagement of two meshing pinions of a pinion pair; said first gearing component and a casing therefor being fluid-tight with respect to the interior of the differential gear housing, in which a rotatable drive gear is attached to said first gearing component, wherein:

each of said pinions has a face width and includes a partition in the central region of said face width which divides said face width into two independent regions of engagement, each of said pinions being in toothed engagement with a respective gearing component over one of said regions of engagement and being in toothed engagement with the adjacent pinion over the other region of engagement;

said spur gears having between their respective front sides an axial spacing, wherein said spacing corresponds to twice the thickness of said partitions plus the width of said other region of engagement; and said partition in the region of the pinions being generally round and constructed coaxially to the axis of rotation of said pinions, with the external diameter of said partition corresponding to the diameter of the tooth tip of said pinions.

2. A differential gearing according to claim 1, wherein said two regions of engagement have the same respective width on both sides of the partition on each pinion.

3. A differential gearing according to claim 2, wherein the respective spur gears have toothing, wherein the width of said toothing corresponds to the region of engagement of the meshing pinion.

4. A differential gearing according to claim 1, in which said partition consists of at least two parts, wherein said parts are attached to the pinion from a radially outer direction.

5. A differential gearing according to claim 1, in which said partition is constructed as a ring divided on one side, and said pinion includes a circumferential groove, said groove extending deeper than the tooth base of said pinion, wherein said ring is inserted in the form of a snap ring.

6. A differential gearing according to claim 1, in which a respective pinion encloses a shaft with a flange, wherein said flange has a diameter corresponding to the tip diameter of the pinion, and wherein the toothed portion of said pinion comprises the respective width of the region of engagement and is securely rotationally attached as a separate component to the shaft adjacent the flange.

7. A differential gearing according to claim 6, wherein said flange is attached to said shaft as a separate component.

* * * * *